United States Patent [19]
Odate et al.

[11] Patent Number: 5,089,309
[45] Date of Patent: Feb. 18, 1992

[54] SEMITRANSPARENT RESIN CONTAINER WITH PEARLY LUSTER

[75] Inventors: Ryoji Odate; Tomoyuki Haga, both of Kanagawa, Japan

[73] Assignee: Shiseido Co., Ltd., Tokyo, Japan

[21] Appl. No.: 437,563

[22] Filed: Nov. 17, 1989

[30] Foreign Application Priority Data

Nov. 17, 1988 [JP] Japan .................................. 63-288809

[51] Int. Cl.$^5$ ...................... B65D 65/38; C08L 67/03; C08L 23/20
[52] U.S. Cl. ................................ 428/36.92; 428/35.7; 525/177; 215/1 C
[58] Field of Search ........................... 428/36.92, 35.7; 525/177; 215/1 C; 220/622

[56] References Cited

U.S. PATENT DOCUMENTS

| | | | |
|---|---|---|---|
| 3,361,848 | 1/1968 | Siggel | 525/177 |
| 3,578,730 | 5/1971 | Herwig | 525/177 |
| 3,839,499 | 10/1974 | Jadamus | 525/177 |
| 3,934,743 | 1/1976 | McChesney | 428/36.92 |
| 4,609,710 | 9/1986 | Iohara | 525/177 |

FOREIGN PATENT DOCUMENTS 1182820  12/1964  Fed. Rep. of Germany .

Primary Examiner—Ellis P. Robinson
Assistant Examiner—Rena L. Dye
Attorney, Agent, or Firm—Sughrue, Mion, Zinn, Macpeak & Seas

[57] ABSTRACT

A semitransparent resin container having a pearly luster is disclosed, comprising a thermoplastic resin composition comprising from 99.1 to 99.9% by weight of a polyester resin and from 0.1 to 0.9% by weight of polymethylpentene, produced by performing said composition followed by biaxial stretch blow molding. The container assumes a deep pearly appearance and also has semitransparency for letting its content be seen from the outside. The container can be produced with satisfactory molding properties at low cost.

2 Claims, 1 Drawing Sheet

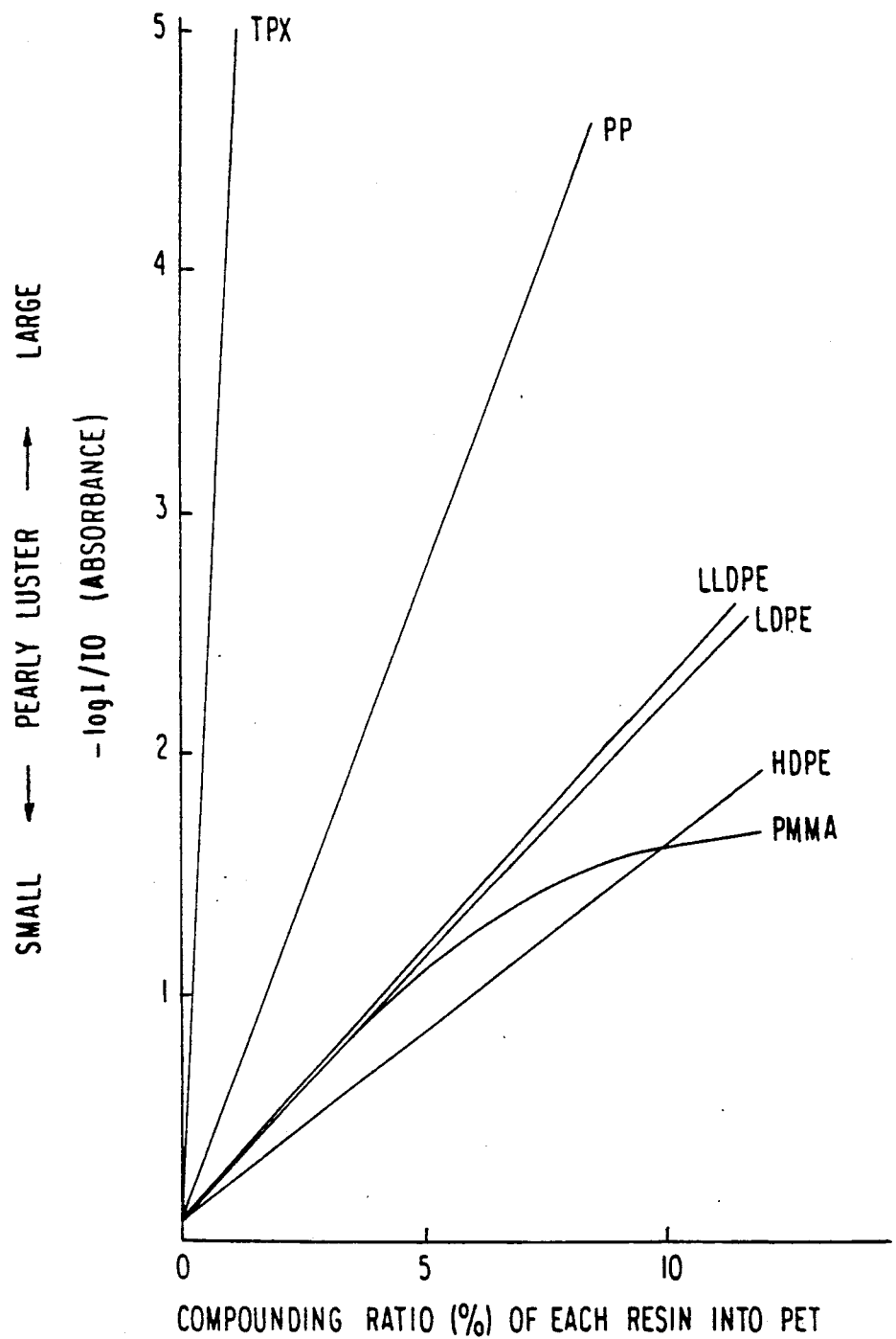

5,089,309

SEMITRANSPARENT RESIN CONTAINER WITH PEARLY LUSTER

FIELD OF THE INVENTION

This invention relates to a semitransparent resin container having a pearly luster, and more particularly to a semitransparent resin container with a pearly luster for giving an attractive appearance to cosmetics, shampoos, hair rinses, foods, drugs, etc.

BACKGROUND OF THE INVENTION

It has conventionally been carried out to add a beautiful luster of pearls to a container whose appearance is of importance.

One of the generally employed techniques to add a pearly luster comprises applying plate crystals of pearly lusterimparting agents, such as fish scale guanine, talc powder, various lead salts, mica, and titanium pearlescent pigments, on the surface of an object or kneading these pearlescent agents into an object.

A thermoplastic resin composition comprising 5 to 94% by weight of a polyacrylate resin, 0.5 to 70% by weight of a saturated aliphatic polyolefin resin, and 5 to 94% by weight of a polystyrene resin or an aromatic polyester resin is known to have a pearly luster as disclosed in JP-B-46-31467 (the term "JP-B" as used herein means an "examined published Japanese patent application").

Also known is a resin container with a metallic luster comprising 10 to 99% by weight of a polyester resin and 1 to 90% by weight of a polyolefin resin, the thin wall of which has been oriented at least uniaxially, as disclosed in JP-B-61-39336.

Further, JP-B-62-58974 discloses a polyester hollow container having a matte pearly luster comprising a blend of a thermoplastic polyester resin containing ethylene terephthalate as a main repeating unit and having an intrinsic viscosity of from 0.75 to 1.40 and at least one member, selected from the group consisting of a methacrylate resin, a saturated fatty acid polyolefin resin, and a styrene resin, produced by blow molding with biaxial stretch and matte-finishing.

According to the method of applying or kneading a pearly luster-imparting agent, the pearly luster obtained lacks depth because it is given from the agent existing on the surface of an object. Moreover, the pearly luster-imparting agents are expensive, increasing the cost.

Any of the above-described conventional techniques, though able to give a pearly luster to a container itself (e.g., bottles), only provides an opaque container due to a large proportion of the pearly luster-imparting agent or the pearlescent resin so that the content of the container, e.g., cosmetics, cannot be seen from the outside, and one cannot tell the hue or the residue of the content in the opaque container.

In addition, since any of the compositions according to the above-described conventional techniques are compounded with a substantial amount of other resins than a polyester resin, the properties of the polyester resin are changed, resulting in deterioration of moldability when preformed, and non-uniformity of a section when blow molded.

SUMMARY OF THE INVENTION

An object of this invention is to provide a semitransparent resin container with a pearly luster which is free from the above-described disadvantages.

This invention relates to a semitransparent resin container comprising a thermoplastic resin composition comprising from 99.1 to 99.9% by weight of a polyester resin and from 0.1 to 0.9% by weight of polymethylpentene, produced by preforming said composition followed by biaxial stretch blow molding.

BRIEF DESCRIPTION OF THE DRAWING

The figure shows a correlated relationship with the absorbance of each resin compounded. The absorbance calculated from the transmittance data of Table 3 in Example 3 is plotted against the compounding ratio.

DETAILED DESCRIPTION OF THE INVENTION

Since the container of the present invention is made of a composition comprising a polyester resin as a major component having kneaded therein a small amount of polymethylpentene, the excellent physical characteristics, moldability, and transparency inherent to a polyester resin are retained. Although the amount of polymethylpentene which contributes to pearly luster is small, the shortage of pearly luster can be compensated for by biaxial stretching of the polymethylpentene in blow molding, which also brings about improved strength of the container.

When a cellophane tape was adhered on the surface of the container according to the present invention and stripped off, the container suffered from no damage on appearance.

Further, the container of the present invention has an economical advantage over conventional containers with a pearly luster obtained from polyethylene terephthalate on comparison of mixing the pearl agents at cost.

The polyester resin which can be used in the present invention may be any of those capable of being molded by biaxial stretch blow molding, preferably including polyethylene terephthalate. Also included is a copolymer comprising terephthalic acid and ethylene glycol, a part of the terephthalic acid being replaced with an aromatic dicarboxylic acid (e.g., isophthalic acid, naphthalenedicarboxylic acid, diphenyldicarboxylic acid, diphenoxyethanedicarboxylic acid, diphenyl ether dicarboxylic acid, and diphenylsulfone dicarboxylic acid), an alicyclic dicarboxylic acid (e.g., hexahydroterephthalic acid and hexahydroisophthalic acid), an aliphatic dicarboxylic acid (e.g., adipic acid, sebacic acid, and azelaic acid) or other bifunctional carboxylic acids, such as hydroxy acids (e.g., p-β-hydroxyethoxybenzoic acid and ε-oxycaproic acid) and/or a part of the ethylene glycol being replaced with other glycol compounds (e.g.,trimethylene glycol, tetramethylene glycol, hexamethylene glycol, decamethylene glycol, neopentylene glycol, diethylene glycol, triethylene glycol, 1,1-cyclohexanedimethylol, 1,4-cyclohexanedimethylol, 2,2-bis(4-β-hydroxyethoxyphenyl)propane, and bis(4-βhydroxyethoxyphenyl)sulfone) or polyfunctional derivatives thereof, the ratio of the copolymerization components other than terephthalic acid and ethylene glycol being not more than 20 mol%.

Polymethylpentene which can be used in the present invention is commercially available TPX (produced by Mitsui Petrochemical Inds., Ltd.; the molecular weight (number) of 100,000 to 1,000,000), a polyolefin resin mainly comprising 4-methylpentene-1. The polymethylpentene in the present invention includes not only homopolymers but also coplymers, polymer derivatives, and polymer blends.

The present invention is now illustrated in greater detail with reference to Examples, but it should be understood that the present invention is not construed as being limited thereto.

EXAMPLE 1

A polyester resin "Unipet RT-513" (produced by Nippon Unipet K.K.) was compounded with each of the resins shown in Table 1 below at the indicated compounding ratio. The compound was preformed into a parison, and the parison was molded by biaxial stretch blow molding using a biaxial stretch blow molding machine "ASD 50 EX" (manufactured by Nissei Jushi Kogyo K.K.) to obtain a 975 ml-volume bottle.

Molding properties (uniformity of section and stretchability of parison) and pearly luster of each of the resulting bottles were observed. The results obtained are shown in Table 1 below. Abbreviations used in the Table have the following meanings.

- TPX: Polymethylpentene "MX-002" (produced by Mitsui Petrochemical Inds., Ltd.)
- PP: Polypropylene "Chisso K-7011" (produced by Chisso Petrochemical Co., Ltd.)
- HDPE: High-density polyethylene "Sholex 5003" (produced by Showa Denko K.K.)
- LDPE: Low-density polyethylene "Sumikathene F412-1" (produced by Sumitomo Chemical Co., Ltd.)
- LLDPE: Linear low-density polyethylene "Ultzex 352DL" (produced by Mitsui Petrochemical Inds., Ltd.)
- EVA: Ethylene-vinyl acetate copolymer "Evaflex P2505" (produced by Mitsui Du Pont Chemical Co., Ltd.)
- PMMA: Polymethyl methacrylate "Parapet G1000" (produced by Kyowa Gas Chemical Industry Co., Ltd.)

TABLE 1

| Run No. | Compounded Resin | Compounding Ratio (wt %) | Molding Properties | Pearly Luster |
|---|---|---|---|---|
| 1 | TPX | 0.5 | good | good |
| 2 | " | 3 | fairly good | good |
| 3 | " | 10 | poor | good |
| 4 | PP | 0.5 | good | poor |
| 5 | " | 3 | fairly good | fairly good |
| 6 | " | 10 | very poor | good |
| 7 | HDPE | 0.5 | good | poor |
| 8 | " | 3 | very poor | fairly good |
| 9 | " | 10 | very poor | fairly good |
| 10 | LDPE | 0.5 | good | poor |
| 11 | " | 3 | poor | fairly good |
| 12 | " | 10 | very poor | good |
| 13 | LLDPE | 0.5 | good | poor |
| 14 | " | 3 | poor | fairly good |
| 15 | " | 10 | very poor | good |
| 16 | EVA | 0.5 | good | poor |
| 17 | " | 3 | good | fairly good |
| 18 | " | 10 | poor | good |
| 19 | PMMA | 0.5 | good | poor |
| 20 | " | 3 | fairly good | fairly good |
| 21 | " | 10 | poor | good |

As can be seen from the results of Table 1, it is only TPX that retains satisfactory molding properties and gives a pearly luster when compounded into the polyester resin at a compounding ratio of 0.5% by weight.

EXAMPLE 2

A 880 ml-volume bottle was produced from a compound of the same polyethylene terephthalate as Example 1 and TPX, with the compounding ratio of TPX being varied as shown in Table 2 below, using a biaxial stretch blow molding machine "YB-8" (manufactured by Yoshino Kogyo Co., Ltd.) for polyethylene terephthalate mass production. The pearly luster of each of the resulting bottles was observed, and the results obtained are shown in Table 2 below.

TABLE 2

| Compounding Ratio of TPX (wt %) | Pearly Luster |
|---|---|
| 1.00 | good (garish) |
| 0.90 | good (no garish) |
| 0.82 | good (no garish) |
| 0.62 | good (no garish) |
| 0.52 | good (no garish) |
| 0.22 | good (no garish) |
| 0.10 | good (no garish) |
| 0.09 | fairly good (no garish) |

It can be seen from the results of Table 2 that the compounding ratio of TPX is preferably 0.1% to 0.9% by weight.

EXAMPLE 3

Bottles were produced in the same manner as in Examples 1 and 2. Transmittance of the bottles (wall thickness: 0.5 mm) was measured at a wavelength of 800 nm using an autographic recording spectrophotometer "Model 304" (manufactured by Hitachi, Ltd.). The results obtained are shown in Table 3 below.

TABLE 3

| Compounding Ratio (wt %) | Compounded Resin And Transmittance (%) | | | | | |
|---|---|---|---|---|---|---|
| | TPX | PP | HDPE | LDPE | LLDPE | PMMA |
| 1.00 | 0.005 | | | | | |
| 0.82 | 0.047 | | | | | |
| 0.62 | 0.26 | | | | | |
| 0.52 | 0.109 | 60.36 | 61.5 | 70.75 | 69.3 | 59.22 |
| 0.42 | 0.73 | | | | | |
| 0.11 | 41.6 | | | | | |
| 0.00 | | ←—88.3—→ | | | | |
| 3 | | 2.42 | 23.46 | 22.17 | 27.1 | 19.41 |
| 10 | | 0 | 2.57 | 0.62 | 0.54 | 2.66 |

Absorbance of each sample was calculated from the transmittance data of Table 3 according to Lambert-Beer's law:

$$-\log I/I_o = -\log T = A_t = \tau b$$

wherein Io is a light intensity before transmission; I is a light intensity after transmission; T is a transmittance; At is an absorbance; $\tau$ is a turbidity coefficient; and b is a thickness.

From the fact that the pearly luster of the bottle is correlated with the absorbance of each resin compounded, the thus calculated absorbance was plotted against the compounding ratio as shown in the figure.

The results of Table 3 and the figure reveal that the bottles containing the polyolefin resin or polymethyl methacrylate have a larger transmittance than that of the bottles containing TPX and that the polyolefin resin or polymethyl methacrylate should be used in a considerably large quantity to attain a pearly luster on the same level of the TPX-containing bottles.

The bottles containing at least 0.1% by weight of polymethylpentene assume a pearly luster. With the compounding ratio of polymethylpentene being 1.0% by weight or more, the content of the bottles is difficult to see from the outside due to the pearly luster.

The polyolefin resin other than polymethylpentene, i.e., polypropylene, high-density polyethylene or low-density polyethylene, or polymethyl methacrylate, endows a bottle with a bare pearly luster when compounded to polyethylene terephthalate in a ratio of 3% by weight. However, the bottles containing such a large amount of the resin undergo considerable deterioration of blow molding properties, suffering from section non-uniformity.

EXAMPLE 4

A 880 ml-volume bottle was produced from a compound of polyethylene terephthalate and TPX, the compounding ratio of TPX being varied as shown in Table 4 below.

A colored shampoo or hair rinse was filled in the bottle, and ease of seeing the content of the bottle from the outside, i.e., see-through, was judged with eyes. The results obtained are shown in Table 4 below.

TABLE 4

| Compounding Ratio of TPX (wt %) | See-Through |
|---|---|
| 0.09 | good |
| 0.1 | good |
| 0.3 | good |
| 0.5 | good |
| 0.7 | good |
| 0.9 | good |
| 1.0 | fairly good |
| 1.5 | poor |

It can be seen from the results of Table 4 that see-through of the bottle is deteriorated when the proportion of polymethylpentene exceeding 0.9% by weight.

Thus, polymethylpentene, when compounded into polyethylene terephthalate in a small proportion of from 0.1 to 0.9% by weight, provides a semitransparent container with a pearly luster through biaxial stretch blow molding. Because of the small proportion of polymethylpentene, physical properties of polyethylene terephthalate during molding are not substantially impaired, and the compound exhibits excellent molding properties.

With the compounding ratio of polymethylpentene falling within the range of from 0.1 to 0.9% by weight, a colored content in the bottle of the present invention can be seen from the outside to let one know how much he has used of the content, and the hue of the content is made more outstanding by the semitransparent pearly luster. The container of the present invention is therefore suitable for cosmetics, shampoos, hair rinses, and the like.

The semitransparent container provided by the present invention assumes a deep pearly luster and still has semitransparency for letting the content be seen from the outside. Thus, the container with its content has an attractive appearance, and one can tell the properties or the residue of the content at a glance. Further, since the amount of polymethylpentene compounded is small, the excellent physical properties of the polyester resin can be retained. Furthermore, as compared with the conventional containers made of resins containing a pearly luster-imparting agent, a pearly luster can be obtained without using an expensive pearly luster-imparting agent, thus reducing the cost of production.

While the invention has been described in detail and with reference to specific embodiments thereof, it will be apparent to one skilled in the art that various changes and modifications can be made therein without departing from the spirit and scope thereof.

What is claimed is:

1. A semitransparent resin container having a pearly luster which comprises a thermoplastic resin composition comprising from 99.1 to 99.9% by weight of a polyester resin and from 0.1 to 0.9% by weight of polymethylpentene having a molecular weight in the range of 100,000 to 1,000,000, produced by preforming said composition followed by biaxial stretch blow molding.

2. A semitransparent resin container as claimed in claim 1, wherein said polyester resin is polyethylene terephthalate.

* * * * *